(12) United States Patent
Kosugi et al.

(10) Patent No.: US 11,397,212 B2
(45) Date of Patent: Jul. 26, 2022

(54) IDENTIFICATION OF CAUSE OF FAILURE IN A POWER STORAGE SYSTEM

(71) Applicant: NEC Corporation, Tokyo (JP)

(72) Inventors: Shinichiro Kosugi, Tokyo (JP); Hiroshi Hanafusa, Tokyo (JP); Yusuke Mori, Tokyo (JP)

(73) Assignee: NEC CORPORATION, Tokyo (JP)

(*) Notice: Subject to any disclaimer, the term of this patent is extended or adjusted under 35 U.S.C. 154(b) by 249 days.

(21) Appl. No.: 16/486,708

(22) PCT Filed: Oct. 19, 2017

(86) PCT No.: PCT/JP2017/037822
§ 371 (c)(1),
(2) Date: Aug. 16, 2019

(87) PCT Pub. No.: WO2018/154845
PCT Pub. Date: Aug. 30, 2018

(65) Prior Publication Data
US 2019/0369165 A1    Dec. 5, 2019

(30) Foreign Application Priority Data
Feb. 21, 2017  (JP) .............................. JP2017-029913

(51) Int. Cl.
*G01R 31/367*  (2019.01)
*G01R 31/392*  (2019.01)
(Continued)

(52) U.S. Cl.
CPC ....... *G01R 31/367* (2019.01); *G01R 31/3828* (2019.01); *G01R 31/392* (2019.01);
(Continued)

(58) Field of Classification Search
None
See application file for complete search history.

(56) References Cited

U.S. PATENT DOCUMENTS 6,684,349 B2 *  1/2004  Gullo ................... G06F 11/008
                                                          701/32.1
2002/0128728 A1  9/2002  Murakami et al.
(Continued)

FOREIGN PATENT DOCUMENTS

JP    2008-090682 A    4/2008
JP    2010-015246 A    1/2010
(Continued)

OTHER PUBLICATIONS

Wilkins, "The Bathtub Curve and Product Failure Behavior Part One—The Bathtub Curve, Infant Mortality, and Burn-in", Reliability HotWire, Issue 21, Nov. 2002 (Year: 2002).*
(Continued)

*Primary Examiner* — Brent A. Fairbanks

(57) ABSTRACT

According to the present invention, provided is a management device (10) including: a collection unit (11) that collects failure information indicating that a failure has occurred in each of a plurality of power storage systems; a computing unit (12) that computes a failure rate in a group in which the power storage systems each having a predetermined matter in common are collected; and an estimation unit (13) that estimates a characteristic of the failure indicated by the failure information, on the basis of the failure rate and a reference value.

15 Claims, 13 Drawing Sheets

(51) Int. Cl.
*H01M 10/48* (2006.01)
*G01R 31/3828* (2019.01)
*H01M 10/44* (2006.01)
*G06Q 40/08* (2012.01)
*H01M 10/42* (2006.01)

(52) U.S. Cl.
CPC ............ *G06Q 40/08* (2013.01); *H01M 10/42* (2013.01); *H01M 10/443* (2013.01); *H01M 10/48* (2013.01); *Y02E 60/10* (2013.01)

(56) References Cited

U.S. PATENT DOCUMENTS

| | | | |
|---|---|---|---|
| 2006/0184379 A1* | 8/2006 | Tan | G06Q 30/02 705/302 |
| 2013/0201018 A1 | 8/2013 | Horstemeyer et al. | |
| 2016/0164697 A1 | 6/2016 | Sakata | |
| 2018/0181967 A1* | 6/2018 | Beaston | G06Q 10/06313 |

FOREIGN PATENT DOCUMENTS

| | | |
|---|---|---|
| JP | 2016-010263 A | 1/2016 |
| WO | WO-2013/140781 A1 | 9/2013 |
| WO | WO-2015/029301 A1 | 3/2015 |

OTHER PUBLICATIONS

Wilkins, "The Bathtub Curve and Product Failure Behavior Part Two—Normal Life and Wear-Out", reliability HotWire, Issue 22, Dec. 2002 (Year: 2002).*

Extended European Search Report issued in European Patent Application No. 17898323.5, dated Jan. 3, 2020, 9 pages.

International Search Report corresponding to PCT/JP2017/037822 dated Dec. 26, 2017 (one page).

* cited by examiner

FIG. 8

| DATE AND TIME | POWER STORAGE SYSTEM ID | FAILED PART | FAILURE ID | ... | ESTIMATION RESULT |
|---|---|---|---|---|---|
| .... | .... | .... | .... | .... | .... |

FIG. 9

DATA STRUCTURE EXAMPLE

INFORMATION ON PRODUCT TO BE MONITORED
  MANUFACTURER, PRODUCT TYPE, DATE OF MANUFACTURE, MANUFACTURING PLANT, MANUFACTURING LOT, TRANSPORTER, TRANSPORTATION LOT, INVENTORY MANAGER, INVENTORY LOT

SUBSYSTEM INFORMATION

MANUFACTURER, PRODUCT TYPE, DATE OF MANUFACTURE, MANUFACTURING PLANT, MANUFACTURING LOT, TRANSPORTER, TRANSPORTATION LOT, INVENTORY MANAGER, INVENTORY LOT

INFORMATION ON PARTS OF SUBSYSTEM

MANUFACTURER, PRODUCT TYPE, DATE OF MANUFACTURE, MANUFACTURING PLANT, MANUFACTURING LOT, TRANSPORTER, TRANSPORTATION LOT, INVENTORY MANAGER, INVENTORY LOT

IDENTIFICATION OF CAUSE OF FAILURE IN A POWER STORAGE SYSTEM

CROSS REFERENCE-TO RELATED APPLICATIONS

This application is a national stage application of International Application No. PCT/JP2017/037822 entitled "Management Device, Management Method, and Program" filed on Oct. 19, 2017, which claims priority to Japanese Patent Application No. 2017-029913 filed on Feb. 21, 2017, the disclosures of which are hereby incorporated by reference in their entirety.

TECHNICAL FIELD

The present invention relates to a management device, a management method, and a program.

BACKGROUND ART

In recent years, a power storage system has become widespread. A related technique is disclosed in Patent Document 1.

Patent Document 1 discloses a storage battery monitoring system including a power storage system including a storage battery and a control unit that controls the storage battery, and a server communicating with the power storage system through a communication network. The server receives characteristic data indicating a state of the storage battery, generates control data for improving a control state of the storage battery, on the basis of the characteristic data and a degradation model of the storage battery, and transmits the control data to the power storage system.

RELATED DOCUMENT

Patent Document

[Patent Document 1] WO2013/140781

SUMMARY OF THE INVENTION

Technical Problem

For example, when compensating for a failure of a power storage system, it is necessary to determine whether the failure that has occurred is to be compensated for. However, in a case where a failure occurs in the power storage system, because it is not possible to estimate what the cause of the failure is, there is a problem that it cannot be properly determined whether or not the failure is to be compensated for.

An object of the present invention is to provide a technique capable of appropriately determining whether a failure occurring in a power storage system is to be compensated for.

Solution to Problem

According to the present invention, there is provided a management device including a collection unit that collects failure information indicating that a failure has occurred in each of a plurality of power storage systems; a computing unit that computes a failure rate in a group in which the power storage systems each having a predetermined matter in common are collected; and an estimation unit that estimates a characteristic of the failure indicated by the failure information, on the basis of the failure rate and a reference value.

Further, according to the present invention, there is provided a management method which is performed by a computer, the method including:

a collection step of collecting failure information indicating that a failure has occurred in each of a plurality of power storage systems;

a computing step of computing a failure rate in a group in which the power storage systems each having a predetermined matter in common are collected; and an estimation step of estimating a characteristic of the failure indicated by the failure information, on the basis of the failure rate and a reference value.

Further, according to the present invention, there is provided a program causing a computer to function as a collection unit that collects failure information indicating that a failure has occurred in each of a plurality of power storage systems;

a computing unit that computes a failure rate in a group in which the power storage systems each having a predetermined matter in common are collected; and an estimation unit that estimates a characteristic of the failure indicated by the failure information, on the basis of the failure rate and a reference value.

Advantageous Effects of Invention

According to the present invention, it is possible to estimate the characteristic of a failure that has occurred in a power storage system.

BRIEF DESCRIPTION OF THE DRAWINGS

The foregoing and other objects, features and advantages will become more apparent from the following description of preferred example embodiments and the accompanying drawings.

FIG. 8 is a diagram schematically showing an example of information processed by the management device of the present example embodiment.

FIG. 9 is a diagram schematically showing an example of information processed by the management device of the present example embodiment.

DESCRIPTION OF EMBODIMENTS

First, the outline of a management device of the present example embodiment will be described.

Figure 1:
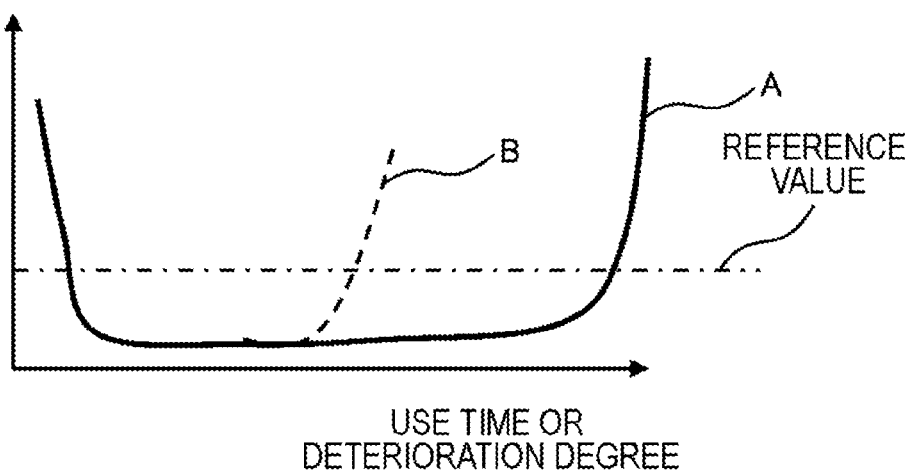
FIG. 1 is a diagram for explaining functions of a management device of the present example embodiment.

The failure rate of an apparatus is known to draw a curve as shown in FIG. 1. The vertical axis represents a failure rate, and the horizontal axis represents the use time (cumulative use time) of the apparatus or the deterioration degree. Immediately after the start of use, an initial failure may occur in many apparatuses. Therefore, the failure rate is large immediately after the start of use. It should be noted that, the failure that occurs immediately after the start of use can be determined relatively easily, by actually testing the apparatus for a certain period of time before releasing the apparatus. Because of this, the problem causing initial failure may be removed from the apparatus before the apparatus comes to market. In addition, failures due to user may occur.

In a case where other problems are not inherent in the apparatus, as shown by curve A, time passes with a low failure rate. It should be noted that, during this time, accidental failures may occur, but they occur sporadically. Thus, a low failure rate is maintained. In addition, the types of accidental failures (a failed part, a failure content, or the like) are various. Thus, when the failure rate for each type of failure is computed, the low failure rate is also maintained. Then, when apparatuses reach the lives of the apparatuses, similar failures occur in a plurality of apparatuses. As a result, as shown by the curve A, the failure rate increases at a predetermined timing.

On the other hand, other problems that occur during manufacturing, transportation, inventory, or the like are common to a plurality of apparatuses (a plurality of apparatuses in the same lot), before apparatuses reach the lives of the apparatuses, similar failures may occur in the plurality of apparatuses. As a result, as shown by the curve B, the failure rate increases before the failure rate increases due to the life. It should be noted that, even before a failure due to a common problem inherent in a plurality of devices occurs, an accidental failure may occur, but they occur sporadically. Thus, a low failure rate is maintained. In addition, the types of accidental failures (a failed part, a failure content, or the like) are various. Thus, when the failure rate for each type of failure is computed, the low failure rate is also maintained.

The management device of the present example embodiment efficiently estimates the characteristic of the failure that has occurred in the power storage system, on the basis of such features and the like. The outline of the process of the management device is as follows.

First, the management device of the present example embodiment collects state information (various measured values) associated with each of the plurality of power storage systems. Then, on the basis of the collected state information, the management device detects the occurrence of a failure in the power storage system, determines the type (a failed part, a failure content, or the like) of failure, determines the use state of the power storage system, or determines the use time and the deterioration degree of the power storage system. It should be noted that, a device other than the management device may collect state information, and perform detection and determination as described above. Then, the management device may acquire the result from the other devices. Then, on the basis of these results, the management device estimates the characteristic of the failure occurring in a certain power storage system.

For example, in a case where the use state of the power storage system deviates from a predetermined use rule, the management device estimates that the failure is a failure due to user.

Further, in a case where the use time and the deterioration degree of the power storage system are equal to or higher than a predetermined level, the management device estimates that the failure is a failure due to life.

In a case where the failure is not the failure due to life, and the failure rate or the number of failure occurrences in a group in which the power storage systems each having a predetermined matter in common are collected exceeds a reference value, the management device estimates that the failure is a failure which is specific to the group. That is, it is estimated that the failure is a failure due to the manufacturer, the transporter, the inventory manager or the like that has occurred during manufacturing, transportation, storage, or the like. By properly creating groups, it is possible to determine a failure which is specific to a certain group without missing it.

Further, in a case where the failure is not the failure due to user, and the failure rate or the number of failure occurrences in a group in which the power storage systems each having a predetermined matter in common are collected does not exceed a reference value, the management device estimates that the failure is a failure that has occurred accidentally.

As described above, according to the management device of the present example embodiment, it is possible to estimate the characteristic of the failure occurring in the power storage system, on the basis of the information related to the power storage system.

The details of the management device of the present example embodiment will be described below. First, an example of a hardware configuration of the management device will be described. Each functional unit included in the management device of the present example embodiment is realized by any combination of hardware and software, mainly using a central processing unit (CPU) of any computer, a memory, a program to be loaded into the memory, and a storage unit such as a hard disk storing the program (can store programs stored in advance in the stage of shipping the apparatus, and also store programs downloaded from a storage medium such as a compact disc (CD) or a server on the Internet), and a network connection interface. Those skilled in the art will understand that there are various modifications in the realization methods and apparatuses.

Figure 2:
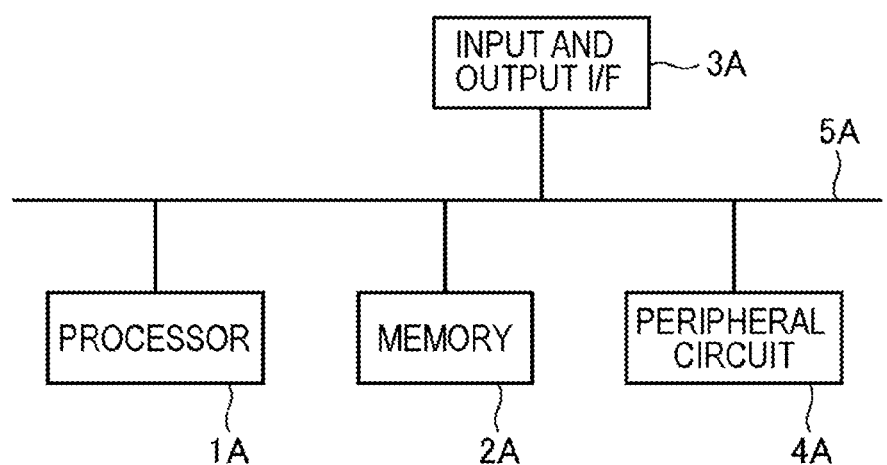
FIG. 2 is a diagram conceptually illustrating an example of a hardware configuration of the management device of the present example embodiment.

FIG. 2 is a block diagram illustrating a hardware configuration of a management device of the present example embodiment. As illustrated in FIG. 2, the management device includes a processor 1A, a memory 2A, an input and output interface 3A, a peripheral circuit 4A, and a bus 5A. The peripheral circuit 4A includes various modules.

The bus 5A is a data transmission path through which the processor 1A, the memory 2A, the peripheral circuit 4A and the input and output interface 3A mutually transmit and receive data. The processor 1A is, for example, an arithmetic processing apparatus such as a central processing unit (CPU)

or a graphics processing unit (GPU). The memory 2A is, for example, a memory such as a random access memory (RAM) or a read only memory (ROM). The input and output interface 3A includes an interface for acquiring information from an input apparatus (for example, a keyboard, a mouse, a microphone, a physical key, a touch panel display, and a code reader), an external apparatus, an external server, an external sensor, and the like, and an interface for outputting information to an output apparatus (for example, a display, a speaker, a printer, and a mailer), an external apparatus, an external server, and the like. The processor 1A issues commands to the respective modules and can perform calculation based on the calculation results.

Figure 3:
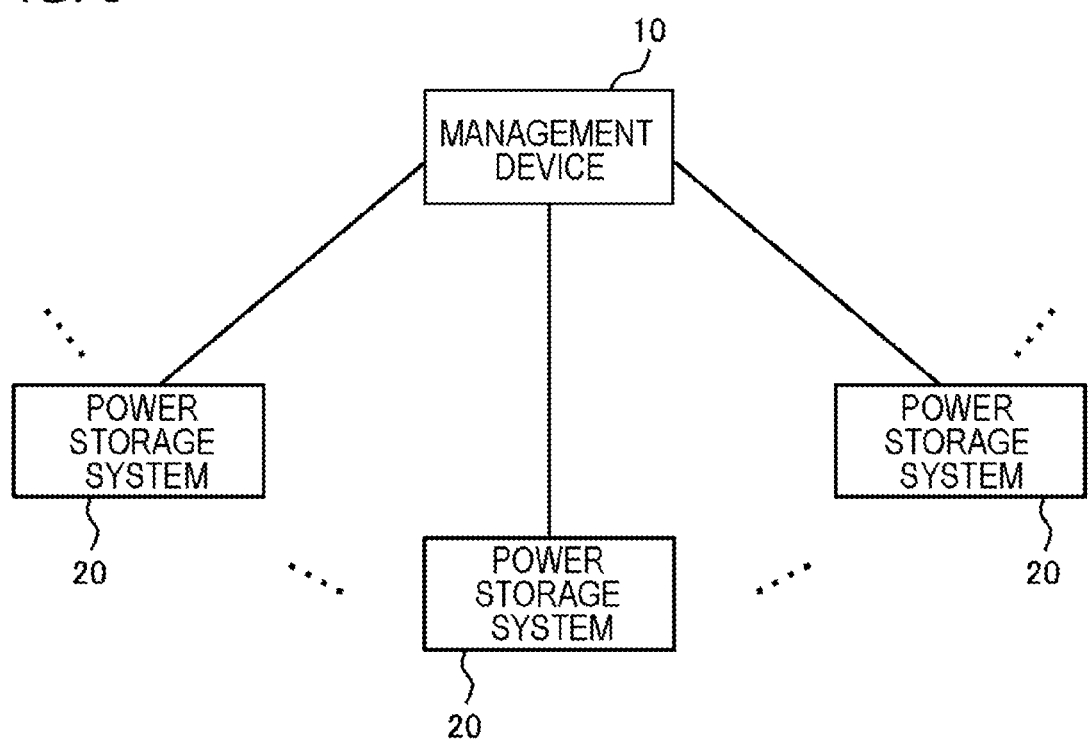
FIG. 3 is an example of a functional block diagram of a management system of the present example embodiment.

Next, an overview of a management system including the management device 10 and the plurality of power storage systems 20 is shown. FIG. 3 is a functional block diagram showing an example of an overview of a management system. As illustrated, the management device 10 and each of the plurality of power storage systems 20 are communicably connected to each other. The management device 10 collects state information (various measured values) associated with each of the plurality of power storage systems 20.

Figure 4:
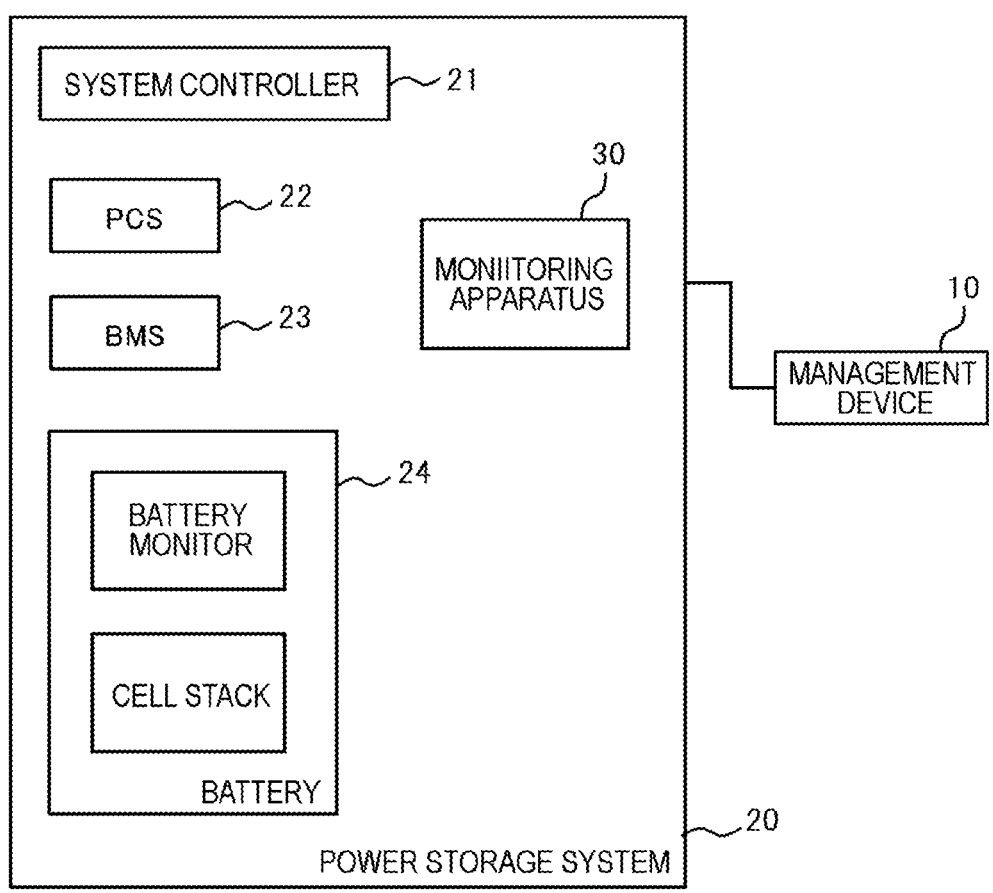
FIG. 4 is an example of a functional block diagram of the management device and a power storage system of the present example embodiment.

FIG. 4 shows a functional block diagram of the management device 10 and one power storage system 20 which are extracted from the management system shown in FIG. 3.

As illustrated, the power storage system 20 includes a system controller 21, a power conditioning system (PCS) 22, a battery management system (BMS) 23, a battery 24, and a monitoring apparatus 30.

The system controller 21 controls the entire power storage system 20. The PCS 22 performs conversion of DC power/AC power. The battery 24 stores electric power. The battery 24 includes, for example, a cell stack that stores energy, a battery monitor that monitors cell temperature, cell voltage, or the like. The BMS 23 controls the battery 24. The monitoring apparatus 30 acquires various measured values, from at least one of the system controller 21, the PCS 22, the BMS 23, and the battery 24. Then, the monitoring apparatus 30 transmits a part or all of the measured values to the management device 10. The management device 10 is, for example, a cloud server.

Figure 5:
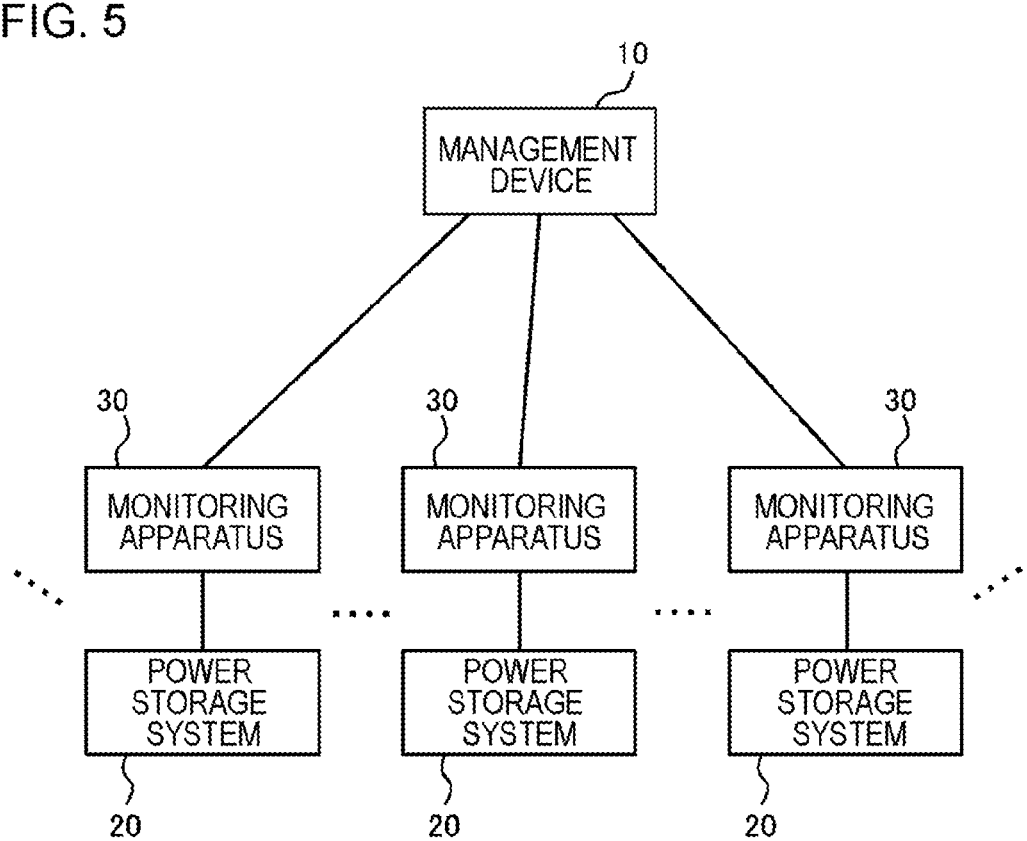
FIG. 5 is an example of a functional block diagram of a management system of the present example embodiment.

FIG. 5 is a functional block diagram showing another example of an overview of the management system. As illustrated, the management device 10 and each of the plurality of monitoring apparatuses 30 are communicably connected to each other. Each of the plurality of monitoring apparatuses 30 and each of the plurality of power storage systems 20 are communicably connected to each other. The management device 10 collects state information (various types of measured values) associated with each of the plurality of power storage systems 20, from each of the plurality of monitoring apparatuses 30.

Figure 6:
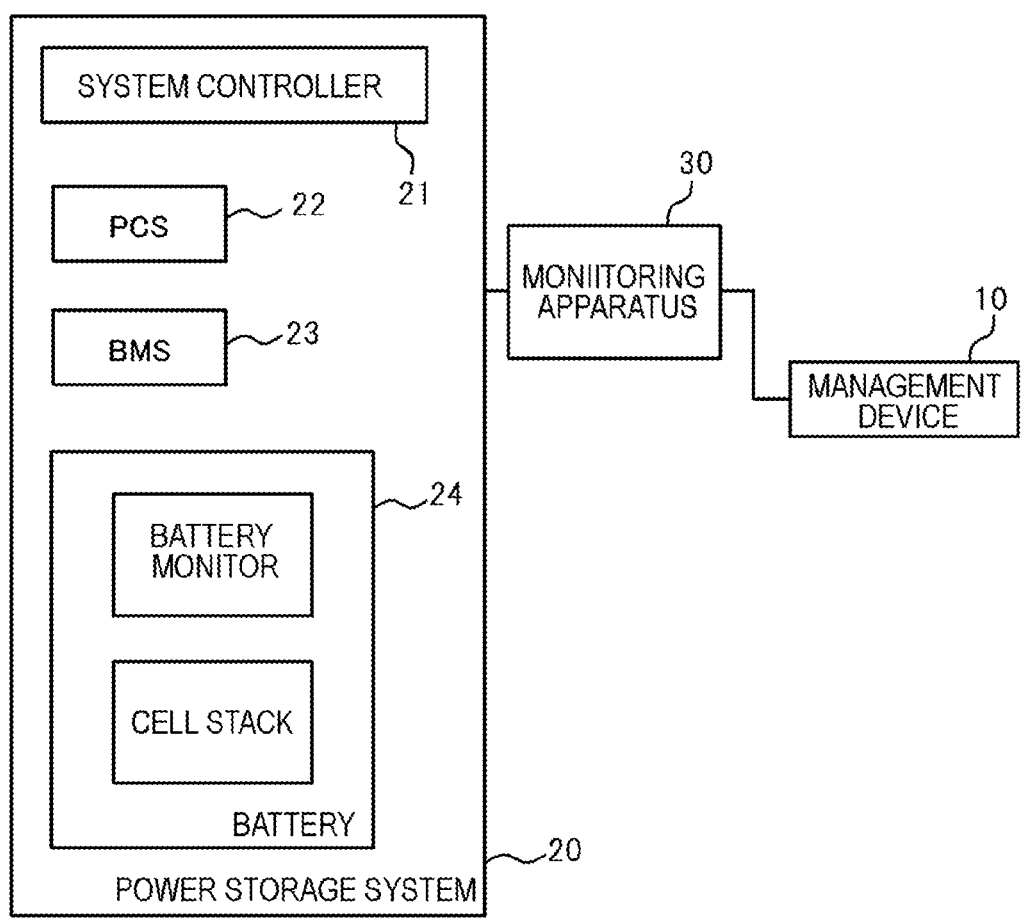
FIG. 6 is an example of a functional block diagram of the management device, a monitoring apparatus, and the power storage system of the present example embodiment.

FIG. 6 shows a functional block diagram of the management device 10, one monitoring apparatus 30, and one power storage system 20 which are extracted from the management system shown in FIG. 5. The power storage system 20 and the monitoring apparatus 30 are physically and/or logically integrated in the example shown in FIG. 4, but the power storage system 20 and the monitoring apparatus 30 are physically and/or logically separated in the example shown in FIG. 6. Other configurations are common.

Figure 7:
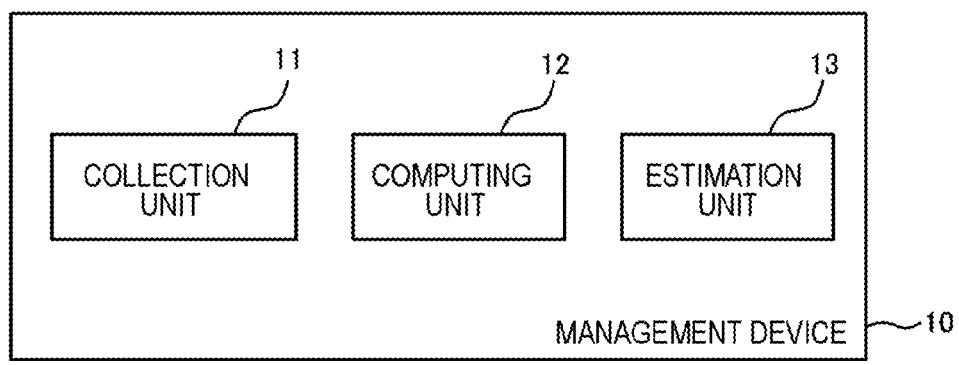
FIG. 7 is an example of a functional block diagram of the management device of the present example embodiment.

Next, the functional configuration of the management device will be described. FIG. 7 shows an example of a functional block diagram of the management device 10. As illustrated, the management device 10 includes a collection unit 11, a computing unit 12, and an estimation unit 13.

The collection unit 11 collects failure information indicating that a failure has occurred in each of a plurality of power storage systems. The failure information may include information indicating the type of failure (a failed part, failure content, or the like). The failure information is created, for example, on the basis of state information (various types of measured values and the like) associated with each of the plurality of power storage systems 20.

The state information may be the current value and the voltage value of the whole power storage system 20, the current value, the voltage value, and the insulation resistance value of each cell stack, the voltage value of each cell, the execution time of the cell balance of each cell (the execution time of the process of discharging until the cell voltage reaches a target value), the time (interval time) between the cell balance and the next cell balance, the temperature of the power storage system 20, the predetermined gas concentration, the image obtained by capturing the power storage system 20, the image obtained by capturing the surrounding of the power storage system 20, the output value of an open and close sensor that detects opening and closing of a door of the power storage system 20, the output value of a vibration sensor that detects vibration occurring in the power storage system 20, the output value of a submergence sensor attached to the power storage system 20 at a predetermined position, the communication retry count during communication between the power storage system 20 and the management device 10, or the like. It should be noted that, the illustration here is only an example, and the present invention is not limited thereto.

The process of detecting the occurrence of a failure, determining a failed part, and determining the content of the failure (for example, ground fault, communication failure, or the like) is a design matter, and any technique can be adopted. For example, the failure may be detected by detecting a change in the measured value (deviation from the reference range, continuing deviation from the reference range for a predetermined time or more, and the like). In addition, the failed part or the failure content may be determined on the basis of the type of measured value or the measurement place where the change occurs. The management device 10 may detect a failure and determine the type of a failure. In addition, an apparatus other than the management device 10 may detect a failure and determine the type of a failure. Then, the management device 10 may acquire the detection result or the determination result from the apparatus.

FIG. 8 typically shows an example of the information collected by the collection unit 11. In FIG. 8, the failure occurrence date and time, the power storage system identifier (ID) of the power storage system 20 in which the failure has occurred, information indicating the part in which the failure has occurred (failed part), the failure ID indicating the type of failure, and the estimation result are associated with each other.

The power storage system ID is information for identifying each of the plurality of power storage systems 20 managed by the management device 10. The failed part is information for identifying a plurality of types of parts provided in the power storage system 20, and for example, a product type, a product name, a manufacturer, and the like of a part are illustrated. The failure ID is information for identifying the failure content of each of a plurality of types of failures determined on the basis of the state information. The estimation result is the characteristic of each failure estimated by the estimation unit 13 described below.

Returning to FIG. 7, the computing unit 12 computes the failure rate and/or the number of failure occurrences in a group in which the power storage systems 20 having a predetermined matter in common are collected. It should be noted that, the computing unit 12 may compute the failure rate and/or the number of failure occurrences in each group for each type of failure. The failures are classified into a plurality of types according to, for example, the failed parts and the contents of the failures.

Here, the details of the grouping will be described. First, attribute information of each of the plurality of power storage systems 20 to be managed is registered in advance. The computing unit 12 creates a group by selecting power storage systems 20 having a predetermined matter in common, on the basis of the attribute information.

FIG. 9 shows an example of attribute information registered for each power storage system 20. It should be noted that, the shown attribute information is merely an example, and may not include part of the shown attribute information, or may include other types of attribute information.

For example, a manufacturer, a product type, a date of manufacture, a manufacturing plant, a manufacturing lot, a transporter, a transportation lot, an inventory manager, an inventory lot, and the like for each power storage system 20 are registered.

In addition, attribute information of one or a plurality of subsystems (parts) included in each power storage system 20 is registered for each power storage system 20. The subsystem is the system controller 21, the PCS 22, the BMS 23, the battery 24, and the like. For example, a manufacturer, a product type, a date of manufacture, a manufacturing plant, a manufacturing lot, a transporter, a transportation lot, an inventory manager, an inventory lot, and the like of each subsystem are registered.

In addition, attribute information of one or a plurality of parts included in each subsystem is registered for each power storage system 20. For example, a manufacturer, a product type, a date of manufacture, a manufacturing plant, a manufacturing lot, a transporter, a transportation lot, an inventory manager, an inventory lot, and the like of each part are registered.

The computing unit 12 creates a group in which the power storage systems 20 having one or a plurality of pieces of the above-described attribute information in common are collected. Then, the failure rate and/or the number of failure occurrences in the group are computed.

The failure rate is computed, for example, by dividing the number of power storage systems 20 in which a failure has occurred by the number of power storage systems 20 belonging to the group. In a case of computing the failure rate for each type of failure, for example, the failure rate is computed by dividing the number of power storage systems 20 in which each failure has occurred by the number of power storage systems 20 belonging to the group. In addition, the failure rate may be computed by dividing the number of parts in which a failure has occurred by the number of parts belonging to the group. It should be noted that, when describing the processing flow of the management device 10 below using a flowchart, the specific example of the process by the computing unit 12 is described.

The number of failure occurrences is an absolute number, and is the number of failures occurring in the power storage system 20 and parts belonging to each group.

Referring back to FIG. 7, the estimation unit 13 estimates the characteristic of the failure indicated by the failure information collected by the collection unit 11.

For example, the estimation unit 13 can estimate the characteristic of the failure occurring in each power storage system 20, on the basis of the use state of each power storage system 20. The use state is determined on the basis of the above-described state information (various measured values and the like). As the determined use state, the temperature of the power storage system 20, the installation location of the power storage system 20 determined on the basis of an image, or the like, the presence or absence and frequency of opening/closing of the door of the power storage system 20 determined on the basis of an open/close sensor, the presence or absence of movement of the power storage system 20 determined on the basis of the image and the vibration sensor, the presence or absence of submergence determined by a submergence sensor installed at a predetermined height of the power storage system 20 (whether the power storage system 20 has been submerged to that height), and the like are illustrated, but the present invention is not limited thereto.

In a case where the use state of the failed power storage system 20 deviates from a predetermined use rule, the estimation unit 13 can estimate that the failure occurring in the power storage system 20 is a failure due to user. As the use rules, temperature restriction (used in the range of $Z°$ C. to $Y°$ C.), installation location restriction (used in places not exposed to direct sunlight), movement restriction (prohibition of movement), operation restriction (prohibition of opening/closing a predetermined door), installation environment restriction (installed in a place not submerged), and the like are illustrated, but the present invention is not limited thereto.

Further, the estimation unit 13 can estimate the characteristic of the failure occurring in each power storage system 20, on the basis of the use time of each power storage system 20 and/or the deterioration degree of each power storage system 20. The use time is an elapsed time from when the use of each power storage system 20 is started to the present time.

For example, the use time can be computed by storing and managing the time when the use of each power storage system 20 is started in any storage device. The deterioration degree can be computed, for example, on the basis of the following Expression (1).

$$\text{Deterioration degree} = f(a_1(C) \times a_2(SOC_{max}, SOC_{min}) \times a_3(T) \times |P|)dt \qquad \text{[Expression 1]}$$

C is the C rate (the speed of charging and discharging) of the battery. For constant-current charging/discharging, the magnitude of the current that causes the theoretical capacity of a battery to be fully charged (or discharged) in one hour is defined as 1C. $a_1(C)$ is a battery deterioration acceleration coefficient determined according to the C rate of the battery. ($SOC_{max}$, $SOC_{min}$) is a range of state of charge (SOC) in which charging and discharging are performed. $a_2(SOC_{max}, SOC_{min})$ is a battery deterioration acceleration coefficient depending on the range of SOC in which charging and discharging are performed. T is the temperature. $a_3(T)$ is a battery deterioration acceleration coefficient depending on the temperature. P is the input and output [W] of the battery 24 or the power storage system 20.

The deterioration degree of the power storage system 20 and parts can be estimated not only by the use time but also by the total input and output amount [kWh]. However, if the power storage system 20 is used under conditions where the current flowing is large, the SOC range in which charging and discharging are performed is wide, or the SOC is 10% or less or 90% or more, the deterioration of the power storage system 20 tends to be accelerated. That is, even if the total input and output amount [kWh] is the same, the deterioration degree varies depending on how it is used. By computing the deterioration degree on the basis of the above Expression (1), it is possible to compute the deterioration degree more in accordance with the actual situation.

It should be noted that, the deterioration degree of parts, such as PCS and a contactor may be computed, on the basis of the following Expression (2). Then, on the basis of the result, the deterioration degree of the power storage system 20 may be computed. For example, a value obtained by adding a value obtained by multiplying the weighting factor of each part by the deterioration degree of each part may be used as the deterioration degree of the power storage system 20.

$$\text{Deterioration degree} = \int (a_1(I/I_r) \times a_3(T) \times |P|) dt \quad [\text{Expression 2}]$$

I is a current value [A]. $I_r$ is a rated current value [A]. $a_1(I/Ir)$ is a battery deterioration acceleration coefficient depending on the ratio of the flowing current value to the rated current value of the part (including the subsystem). T is the temperature. $a_3(T)$ is a battery deterioration acceleration coefficient depending on the temperature. P is the input and output [W] of the battery 24 or the power storage system 20.

In a case where the use time and/or the deterioration degree of the failed power storage system 20 are equal to or more than a predetermined level, the estimation unit 13 can estimate that the failure occurring in the power storage system 20 is a failure due to life.

Further, the estimation unit 13 can estimate the characteristic of the failure, by comparing the failure rate computed by the computing unit 12 with the reference value. It should be noted that, in the case of estimating the characteristic of the first failure occurring in the first power storage system 20 indicated by the first failure information, the estimation unit 13 estimates the characteristic of the first failure, by comparing the first failure rate of the group to which the first power storage system 20 belongs with the reference value. In a case where the failure rate is equal to or higher than the reference value, for example, in a case where the failure rate is equal to or higher than 0.1% when the reference value is 0.1%, the estimation unit 13 estimates that the first failure is a failure which is specific to the group to which the first power storage system 20 belongs or a failure due to the life. It should be noted that, in a case where the failure is not estimated as the failure due to the life, on the basis of the use time and the deterioration degree, the first failure can be estimated as a failure which is specific to the group to which the first power storage system 20 belongs.

Further, in a case where the failure rate is less than the reference value and it is not estimated that the failure is caused by the user on the basis of the use state, the estimation unit 13 can estimate that the first failure is a failure that has accidentally occurred.

It should be noted that, although the reference value to be compared with the failure rate is a value of 1 or less (100% or less), the reference value may be set according to the number of power storage systems 20 or parts belonging to the corresponding group. For example, the reference value may be set higher, as the number of power storage systems 20 and parts belonging to the group is larger. In addition, the reference value may be set according to the past failure history of the power storage system, subsystem, or part. For example, since there is a high possibility that a power storage system, a subsystem, or a part having a large failure rate and a large number of failure occurrences in the past has a failure, the reference value may be lowered.

In addition, the estimation unit 13 may estimate the characteristic of the failure, by comparing the number of failure occurrences computed by the computing unit 12 with the reference value. It should be noted that, in the case of estimating the characteristic of the first failure occurring in the first power storage system 20 indicated by the first failure information, the estimation unit 13 estimates the characteristic of the first failure, by comparing the number of occurrences of the first failure of the group to which the first power storage system 20 belongs with the reference value. In a case where the number of occurrences of failure is equal to or higher than the reference value, for example, in a case where the failure rate is equal to or higher than 5 when the reference value is 5, the estimation unit 13 can estimate that the first failure is a failure which is specific to the group to which the first power storage system 20 belongs or a failure due to the life. It should be noted that, in a case where the failure is not estimated as the failure due to the life, on the basis of the use time and the deterioration degree, the first failure can be estimated as a failure which is specific to the group to which the first power storage system 20 belongs.

It should be noted that, the reference value to be compared with the number of failure occurrences is a predetermined value. The reference value may be determined in accordance with the type of the power storage system 20 or the part. Further, the reference value may be set according to the number of power storage systems 20 and parts belonging to the corresponding group. For example, the reference value may be set higher, as the number of power storage systems 20 and parts belonging to the group is larger. In addition, the reference value may be set according to the past failure history of the power storage system, subsystem, or part. For example, since there is a high possibility that a power storage system, a subsystem, or a part having a large number of failure rate and a large number of failure occurrences in the past has a failure, the reference value may be lowered.

Figure 10:
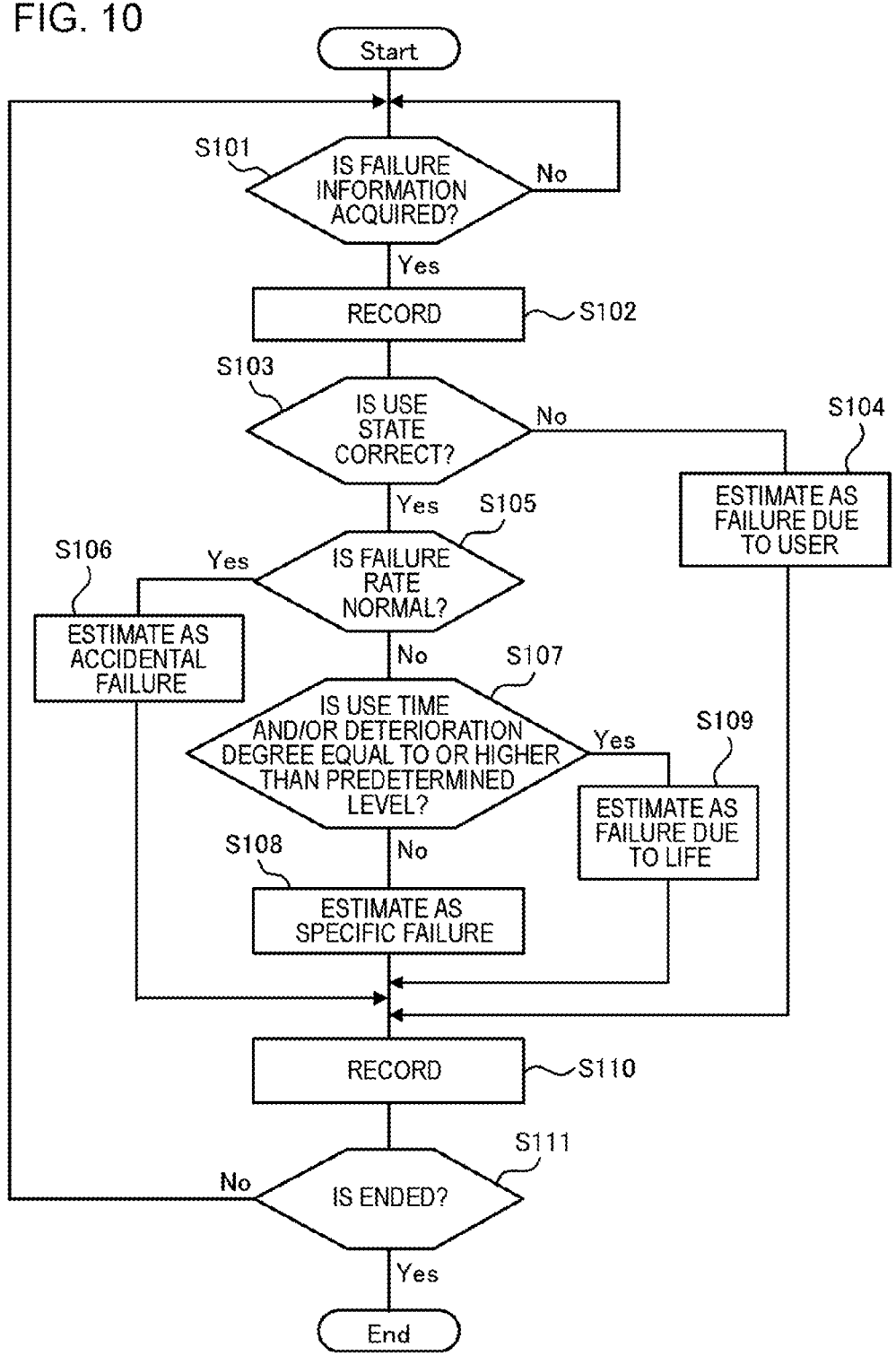
FIG. 10 is a flowchart showing an example of a process flow of the management device of the present example embodiment.

Next, an example of the process flow of the management device 10 of the present example embodiment will be described with reference to the flowchart of FIG. 10.

First, the management device 10 acquires and accumulates state information (various measured values) of each of the plurality of power storage systems 20. The management device 10 may collectively acquire the state information for a predetermined time at predetermined time intervals, or may acquire the state information by real-time processing.

Then, on the basis of the acquired state information, the management device 10 detects the occurrence of a failure in each of the plurality of power storage systems 20, or determines the type of failure (a failed part, a failure content, and the like). The processing may be performed by batch processing or may be performed by real time processing.

In S101, the collection unit 11 is waiting for acquisition of failure information. The failure information includes the date and time of failure, the ID of the failed power storage system 20, the type of failure, and the like. When acquiring the failure information (Yes in S101), the collection unit 11 records it as shown in FIG. 8 (S102). Thereafter, the process of estimating the characteristic of the failure indicated by the failure information newly acquired in S101 is started. It should be noted that, a description will be given below on the assumption that the first failure indicated by the newly acquired failure information occurs in the first power storage system 20.

In S103, the estimation unit 13 determines whether or not the use state of the first power storage system 20 is correct.

Specifically, it is determined whether or not the use state of the first power storage system 20 determined on the basis of the state information of the first power storage system 20 deviates from a predetermined use rule.

For example, the estimation unit 13 may determine whether or not the use state of the first power storage system 20 deviates from the use rule during the period from the start of use of the first power storage system 20 to the current time (period for determination), or may determine whether or not there is any deviation from the use rule within a predetermined time before the current time (period for determination). The period for determination illustrated above is an example, and is not limited thereto. Further, the period for determination may be different for each use rule. Further, the use rules for determining whether or not the use state deviates from the predetermined use rule may be different for each type of failure that has occurred.

It should be noted that, in a case where there is a plurality of use rules for determining whether or not the use state deviates from the predetermined use rule, when the use state of the first power storage system 20 deviates from at least one of the plurality of use rules, the estimation unit 13 may determine that the use state is not correct. In a case where the use state of the first power storage system 20 does not deviate from all of the plurality of use rules, it may be determined that the use state is correct.

In addition, in a case where the use state of the first power storage system 20 deviates from all of the plurality of use rules, it may be determined that the use state is not correct. Then, in a case where the use state of the first power storage system 20 does not deviate from at least one of the plurality of use rules, it may be determined that the use state is correct.

In a case where it is determined that the use state is not correct (No in S103), the estimation unit 13 estimates that the first failure occurring in the first power storage system 20 is a failure due to user (S104). Then, the estimation result is recorded (S110). For example, in the information shown in FIG. 8, the estimation result is recorded in the field of the estimation result corresponding to the first failure of the first power storage system 20.

On the other hand, in a case where it is determined that the use state is correct (Yes in S103), the estimation unit 13 determines whether or not the failure rate is normal (S105).

First, the computing unit 12 creates a group in which the power storage systems 20 having a predetermined matter in common with the first power storage system 20 are collected. Then, the occurrence rate of the first failure in the group is computed.

Specifically, on the basis of the data shown in FIG. 9, the computing unit 12 selects power storage systems 20 having predetermined matters in common with the first power storage system 20 to create a group. Then, on the basis of the data shown in FIG. 8, the number of occurrences of the first failure in the power storage systems 20 belonging to the created group is counted. It should be noted that, even when the first failure occurs, in a case where the estimation result of the failure (refer to FIG. 8) is "a failure due to user" or "a failure due to life", it may not be added to the counted number. Then, the computing unit 12 computes the occurrence rate of the first failure by dividing the counted number by the number of power storage systems 20 belonging to the group.

For example, the computing unit 12 may create a group by collecting power storage systems 20 in which at least one of a manufacturer, a product type, a date of manufacture, a manufacturing plant, a transporter, an inventory manager, and a lot (such as a manufacturing lot, a transportation lot, and an inventory lot) is identical to the first power storage system 20.

In addition, the computing unit 12 may create a group by collecting power storage systems 20 including the same part as the first power storage system 20. For example, the computing unit 12 may create a group by collecting power storage systems 20 including the same part as the part in which the first failure occurs. In this case, among the plurality of power storage systems 20 collected into the same group on the basis of the same part, a power storage system 20 having a manufacturer, a product type, a date of manufacture, a manufacturing plant, a transporter, an inventory manager, a lot, or the like which is different from the first power storage system 20 may be present. That is, the power storage systems 20 of which a manufacturer or a type is different from the first power storage system 20 may belong to the same group.

In addition, the computing unit 12 may create a group by collecting power storage systems 20 having a part in which at least one of a manufacturer, a product type, a date of manufacture, a manufacturing plant, a transporter, an inventory manager, and a lot (such as a manufacturing lot, a transportation lot, and an inventory lot) is identical to a part in which the first failure occurs.

It should be noted that, the computing unit 12 may create one group and compute the occurrence rate of a first failure in the group. In such a case, when the occurrence rate of the first failure in the group is less than the reference value, the estimation unit 13 determines that the failure rate is normal (Yes in S105). Then, it is estimated that the first failure is an accidental failure (a failure occurring accidentally) (S106). Then, the estimation result is recorded (S110). For example, in the information shown in FIG. 8, the estimation result is recorded in the field of the estimation result corresponding to the first failure of the first power storage system 20.

On the other hand, in a case where the occurrence rate of the first failure in the group is equal to or higher than the reference value, the estimation unit 13 determines that the failure rate is abnormal (No in S105).

In addition, the computing unit 12 may change the common matter to create a plurality of groups, and compute the occurrence rate of the first failure in each of a plurality of groups. In such a case, in a case where the occurrence rate of the first failure in all or more than a predetermined percentage of the plurality of groups is less than the reference value, the estimation unit 13 may determine that the failure rate is normal (Yes in S105). Then, it is estimated that the first failure is an accidental failure (a failure occurring accidentally) (S106). Then, the estimation result is recorded (S110). For example, in the information shown in FIG. 8, the estimation result is recorded in the field of the estimation result corresponding to the first failure of the first power storage system 20.

On the other hand, in a case where the occurrence rate of the first failure in at least one group or groups less than a predetermined percentage of the plurality of groups is equal to or higher than the reference value, the estimation unit 13 may determine that the failure rate is abnormal (No in S105).

In a case where it is determined that the failure rate is abnormal (No in S105), the estimation unit 13 determines whether or not the use time and/or the deterioration degree of the first power storage system 20 is equal to or higher than a predetermined level (S107).

In a case where it is equal to or higher than the predetermined level (Yes in S107), the estimation unit 13 estimates that the first failure is a failure due to the life. Then, the estimation result is recorded (S110). For example, in the information shown in FIG. 8, the estimation result is recorded in the field of the estimation result corresponding to the first failure of the first power storage system 20.

On the other hand, in a case where it is less than the predetermined level (No in S107), the estimation unit 13 estimates that the first failure is a specific failure (S108). That is, the estimation unit 13 estimates that the first failure is a specific failure to the group in which the occurrence rate of the first failure is determined, in S105, to be equal to or higher than the reference value. Then, the estimation result is recorded (S110). For example, in the information shown in FIG. 8, the estimation result is recorded in the field of the estimation result corresponding to the first failure of the first power storage system 20.

After S110, if there is no input to end the process (No in Sill), the management device 10 returns to S101 and repeats the process.

As described above, in a case where the failure is not the failure due to life, and the failure rate or the number of failure occurrences in a group in which the power storage systems 20 having a predetermined matter in common are collected exceeds a reference value, the management device 10 estimates that the failure is a failure which is specific to the group. That is, it is estimated that the failure is a failure due to the manufacturer, the transporter, the inventory manager or the like that has occurred during manufacturing, transportation, storage, or the like. By properly creating groups, it is possible to determine a failure which is specific to a certain group without missing it.

As a result, in an insurance company or the like that provides an insurance product that compensates for the failure of the power storage system 20, it can be determined whether or not the failure that has occurred is to be compensated for. That is, the insurance company or the like can exclude the power storage system 20 in which a failure due to user or an accidental failure occurs from the coverage of compensation, and determine the power storage system 20 in which a group-specific failure occurs is included in the coverage of compensation.

Next, another example of the process flow of the management device 10 of the present example embodiment will be described with reference to the flowchart of FIG. 11. The process in FIG. 11 differs from the process in FIG. 10 in the timing of determining whether the use time and/or deterioration degree is equal to or higher than a predetermined level.

First, the management device 10 acquires and accumulates state information (various measured values) of each of the plurality of power storage systems 20. The management device 10 may collectively acquire the state information for a predetermined time at predetermined time intervals, or may acquire the state information by real-time processing.

Then, on the basis of the acquired state information, the management device 10 detects the occurrence of a failure in each of the plurality of power storage systems 20, or determines the type of failure (a failed part, a failure content, and the like). The processing may be performed by batch processing or may be performed by real time processing.

In S201, the collection unit 11 is waiting for acquisition of failure information. The failure information includes the date and time of failure, the ID of the failed power storage system 20, the type of failure, and the like. When acquiring the failure information (Yes in S201), the collection unit 11 records it as shown in FIG. 8 (S202). Thereafter, the process of estimating the characteristic of the failure indicated by the failure information newly acquired in S201 is started. It should be noted that, a description will be given below on the assumption that the first failure indicated by the newly acquired failure information occurs in the first power storage system 20.

In S203, the estimation unit 13 determines whether or not the use time and/or the deterioration degree of the first power storage system 20 is equal to or higher than a predetermined level.

In a case where it is equal to or higher than the predetermined level (Yes in S203), the estimation unit 13 estimates that the first failure is a failure due to the life. Then, the estimation result is recorded (S210). For example, in the information shown in FIG. 8, the estimation result is recorded in the field of the estimation result corresponding to the first failure of the first power storage system 20.

On the other hand, in a case where it is less than the predetermined level (No in S203), the estimation unit 13 determines whether or not the use state of the first power storage system 20 is correct (S205). The details of the determination are the same as S107 in FIG. 10.

In a case where it is determined that the use state is not correct (No in S205), the estimation unit 13 estimates that the first failure occurring in the first power storage system 20 is a failure due to user (S206). Then, the estimation result is recorded (S210). For example, in the information shown in FIG. 8, the estimation result is recorded in the field of the estimation result corresponding to the first failure of the first power storage system 20.

On the other hand, in a case where it is determined that the use state is correct (Yes in S205), the estimation unit 13 determines whether or not the failure rate is normal (S207). The details of the determination are the same as S105 in FIG. 10.

In a case where it is determined that the failure rate is normal (Yes in S207), the estimation unit 13 estimates that the first failure occurring in the first power storage system 20 is an accidental failure (S208). Then, the estimation result is recorded (S210). For example, in the information shown in FIG. 8, the estimation result is recorded in the field of the estimation result corresponding to the first failure of the first power storage system 20.

On the other hand, in a case where it is determined that the failure rate is abnormal (No in S207), the estimation unit 13 estimates that the first failure occurring in the first power storage system 20 is a specific failure. That is, in S207, the failure is estimated as the failure which is specific to the group in which the occurrence rate of the first failure is determined to be equal to or higher than the reference value. Then, the estimation result is recorded (S210). For example, in the information shown in FIG. 8, the estimation result is recorded in the field of the estimation result corresponding to the first failure of the first power storage system 20.

After S210, if there is no input to end the process (No in S211), the management device 10 returns to S201 and repeats the process.

As described above, in a case where the failure is not the failure due to life, and the failure rate or the number of failure occurrences in a group in which the power storage systems 20 having a predetermined matter in common are collected exceeds a reference value, the management device 10 estimates that the failure is a failure which is specific to the group. That is, it is estimated that the failure is a failure due to the manufacturer, the transporter, the inventory manager or the like that has occurred during manufacturing, transportation, storage, or the like. By properly creating groups, it is possible to determine a failure which is specific to a certain group without missing it.

As a result, in an insurance company or the like that provides an insurance product that compensates for the failure of the power storage system 20, it can be determined whether or not the failure that has occurred is to be compensated for. That is, the insurance company or the like can exclude the power storage system 20 in which a failure due to user or an accidental failure occurs from the coverage of compensation, and determine the power storage system 20 in which a group-specific failure occurs is included in the coverage of compensation.

Figure 11:
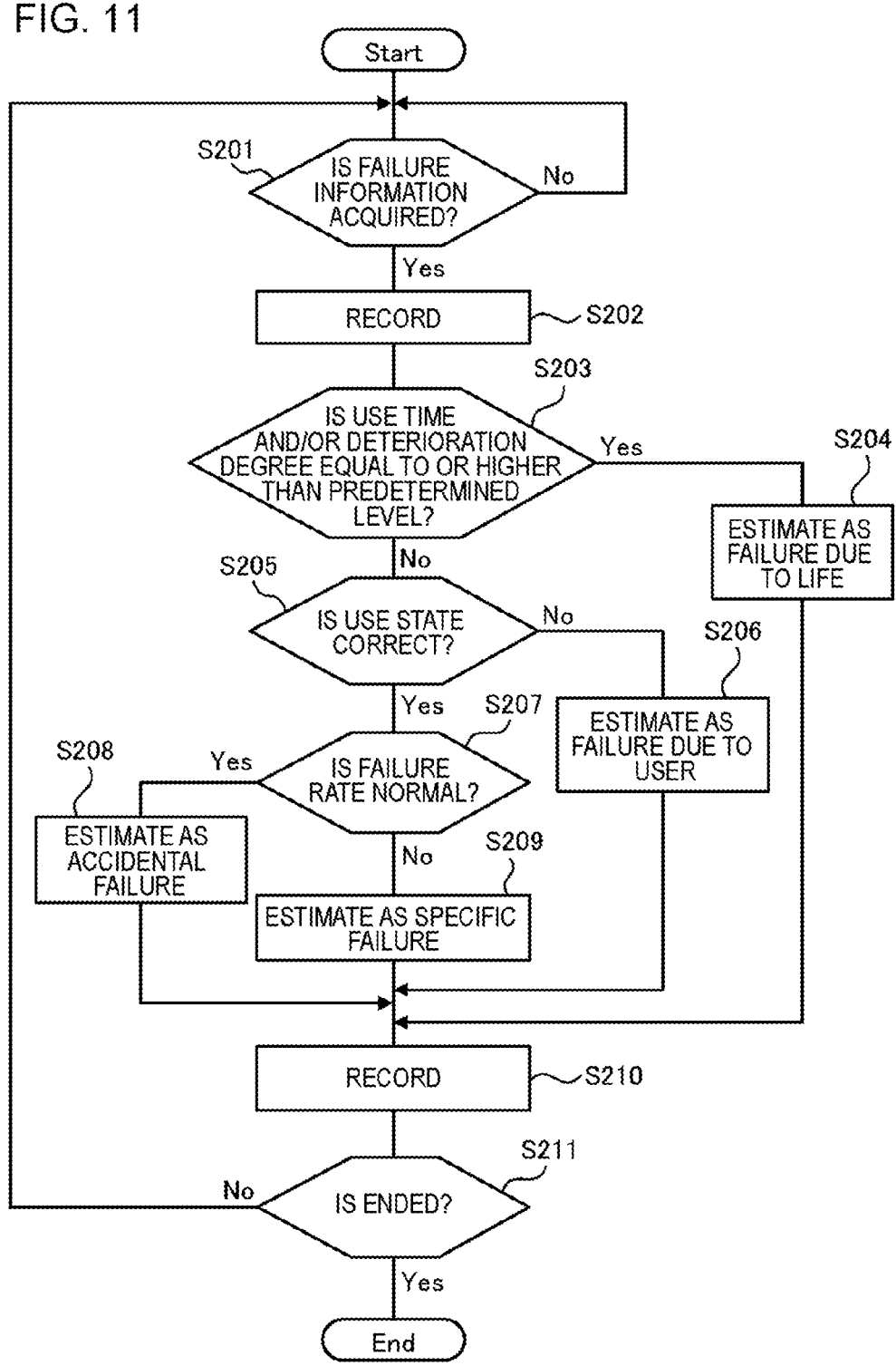
FIG. 11 is a flowchart showing an example of a process flow of the management device of the present example embodiment.

It should be noted that, in the case of the processing example shown in FIG. 11, it is first estimated whether the first failure is a failure due to the life, on the basis of the use time and/or the deterioration degree. In such a case, as compared with the processing example shown in FIG. 10, a failure due to life can be eliminated in advance. Therefore, the failure rate or the number of failure occurrences in a predetermined group can be compared with the reference value with high accuracy.

Similarly, since the failure due to the life can be eliminated in advance, the number of times the failure rate or the number of failure occurrences is compared with the reference value can be reduced, so the processing load can be reduced. Further, the determination of the use state can be performed with high accuracy as well as the failure rate and the number of failure occurrences, and the processing load can be reduced.

Here, a modification example will be described. In S105 and S207, instead of the process of determining whether the failure rate is normal, a process of determining whether the number of failure occurrences is normal may be executed.

Another modification example will be described. In the example described in FIGS. 10 and 11, in S105 and S207, in which whether the occurrence rate and the number of failure occurrences of the first failure are normal is determined, a group is created and the failure rate is computed. As a modification example, in advance, a plurality of groups may be created and information may be generated in which the occurrence rate and the number of occurrences of various failures are collected for each group. It should be noted that, since no failure occurs at the beginning of creation, both the failure rate and the number of failure occurrences are "0". Then, whenever the failure information is recorded in S102 and S202, the above information may be updated.

In such a case, in the determination in S105 and S207 as to whether the failure rate or the number of failure occurrences is normal, the occurrence rate or the number of occurrences of the first failure of the group to which the first power storage system 20 belongs is acquired from the above information and the same determination as the above can be made.

Another modification example will be described. In FIGS. 10 and 11 and the above-described modification example, the determination results in S105 and S207 may differ depending on the timing at which the failure is detected. That is, even if the first failure occurring in the first power storage system 20 is a failure which is specific to a certain group, when estimating characteristic of a failure with respect to the zeroth power storage system 20, in which the first failure first occurs in the group, in S105 and S207, the failure rate and the number of failure occurrences are equal to or less than the reference value, so it is determined as normal (when the first failure occurs in the zeroth power storage system 20, the first failure has not yet been detected in the other power storage systems 20). As a result, as the characteristic of the first failure occurring in the zeroth power storage system 20, characteristics other than the "specific failure" are estimated.

In order to eliminate the problem, the estimation unit 13 may perform the following process, in a case where it is estimated that the first failure occurring in the first power storage system 20 is a specific failure in S108 and S209.

That is, the estimation unit 13 may check the estimation result up to that point (for example, the estimation result of FIG. 8) and check whether the power storage system 20 satisfying the following conditions is present.

(a) It belongs to the group to which the first power storage system 20 belongs, and in which the failure rate or the number of failure occurrences is determined to be equal to or higher than the reference value in S105 and S207;

(b) The first failure that has occurred before the first failure that has occurred in the first power storage system 20 is estimated to have characteristic different from the specific failure.

Then, in a case where the power storage system 20 is present, the estimation result of the characteristic of the first failure of the power storage system 20 may be changed to the specific failure. The problem that the first failure occurring in the first power storage system 20 is not characterized as "specific failure" can be solved by the process of checking if the power storage system 20 meets the above conditions.

Figure 12:
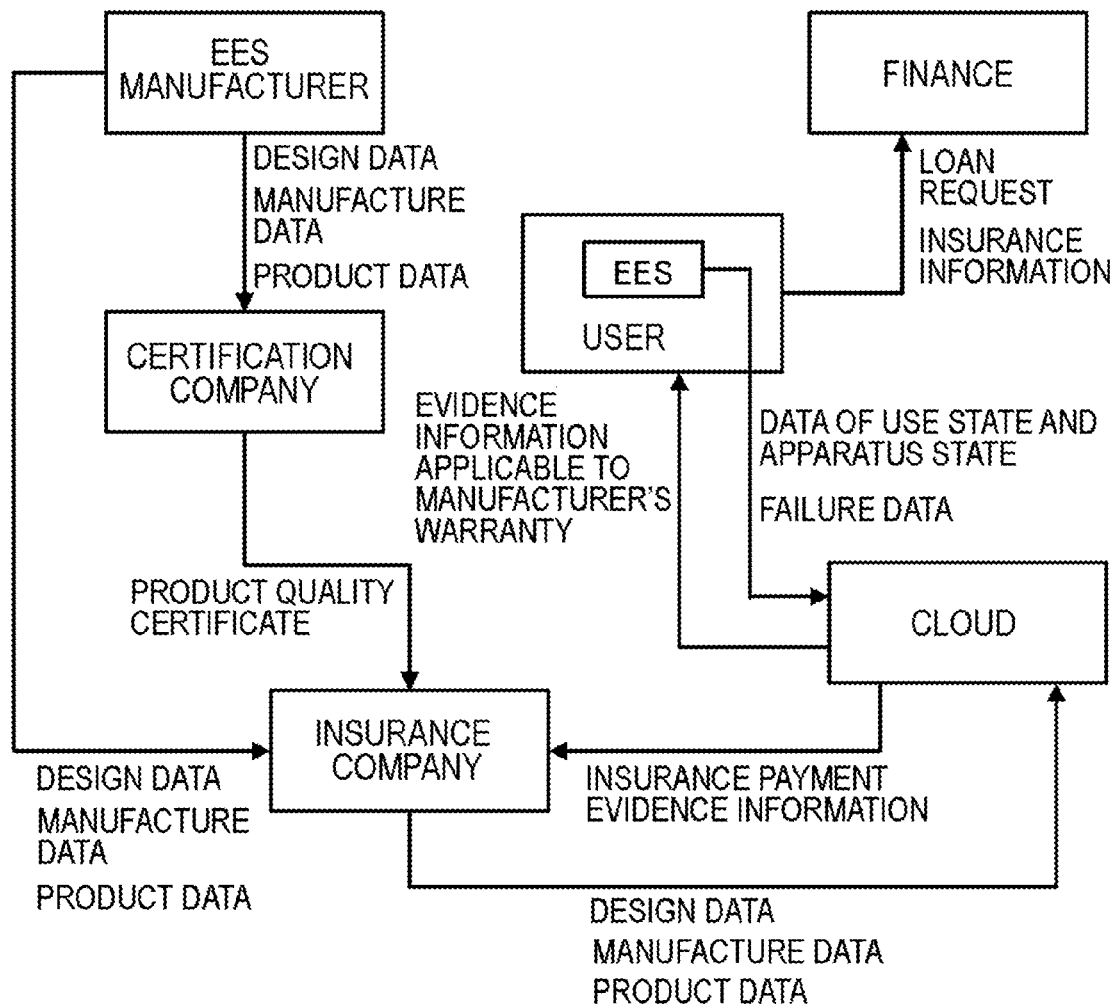
FIG. 12 is a diagram for explaining an application example of the management device of the present example embodiment.

Here, an application example of the management device 10 of the present example embodiment will be described with reference to FIG. 12. The manufacturer of the power storage system 20 (the EES manufacturer) contracts insurance against recall of its own power storage system 20 with the insurance company. A certification company tests the reliability of the power storage system 20 and certifies that it has insurance applicable reliability.

The user who has purchased the power storage system 20 uses the power storage system 20. The user also receives a loan from finance with the power storage system 20 as collateral. At this time, insurance information on the power storage system 20 is utilized.

The management device 10 (cloud) collects state information (various measured values) of the power storage system 20 used by the user, and on the basis of the collected state information, the management device 10 detects the occurrence of a failure in the power storage system 20, determines the type (failed part, failure content, or the like) of failure, determines the use state of the power storage system 20, or determines the use time and the deterioration degree of the power storage system 20. Then, in a case where a failure is detected, the management device 10 estimates the characteristic of the failure.

The estimation result by the management device 10 is provided to the user or the insurance company. The insurance company determines, on the basis of the estimation result, whether or not the failure that has occurred is to be compensated for.

For example, in a case where the failure is not the failure due to life, and the failure rate or the number of failure occurrences in a group in which the power storage systems 20 having a predetermined matter in common are collected exceeds a reference value, the management device 10 estimates that the failure is a failure which is specific to the group. That is, it is estimated that the failure is a failure due to the manufacturer, the transporter, the inventory manager or the like that has occurred during manufacturing, transportation, storage, or the like. By properly creating groups, it is possible to determine a failure which is specific to a certain group without missing it.

As a result, in an insurance company or the like that provides an insurance product that compensates for the failure of the power storage system 20, it can be determined whether or not the failure that has occurred is to be compensated for. That is, the insurance company or the like can exclude the power storage system 20 in which a failure due to user or an accidental failure occurs from the coverage of compensation, and determine the power storage system 20 in which a group-specific failure occurs in included in the coverage of compensation.

Figure 13:
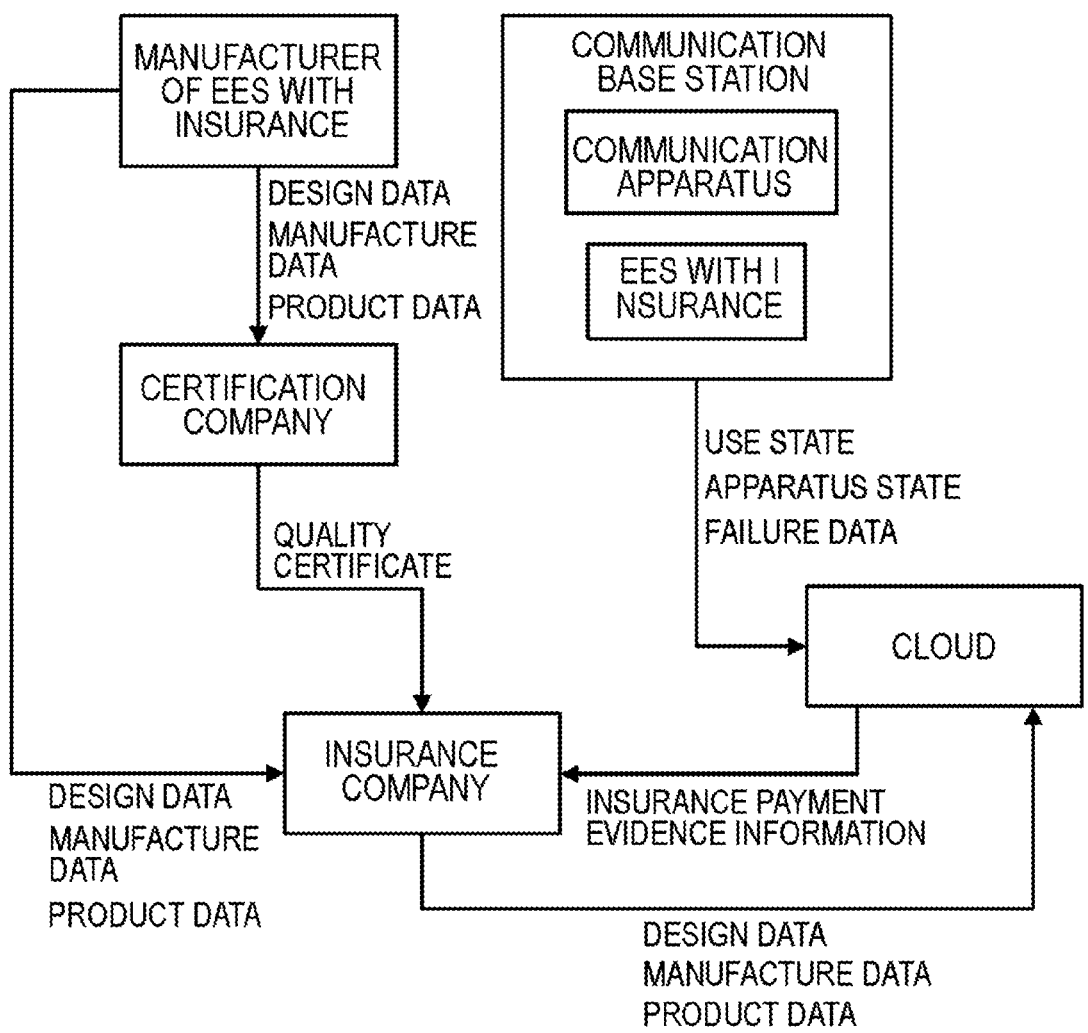
FIG. 13 is a diagram for explaining an application example of the management device of the present example embodiment.

Here, another application example of the management device 10 of the present example embodiment will be described with reference to FIG. 13. The manufacturer of the power storage system 20 (the EES manufacturer) contracts insurance against compensation risk of its own power storage system 20 with the insurance company. The certification company tests the reliability of the power storage system 20 and certifies that it has insurance applicable reliability. The power storage system 20 is used, for example, in a communication base station.

The management device 10 (cloud) collects state information (various measured values) of the power storage system 20 used in the communication base station, and on the basis of the collected state information, the management device 10 detects the occurrence of a failure in the power storage system 20, determines the type (failed part, failure content, or the like) of failure, determines the use state of the power storage system 20, or determines the use time and the deterioration degree of the power storage system 20. Then, in a case where a failure is detected, the management device 10 estimates the characteristic of the failure.

The estimation result by the management device 10 is provided to the communication base station or the insurance company. The insurance company determines, on the basis of the estimation result, whether or not the failure that has occurred is to be compensated for.

For example, in a case where the failure is not the failure due to life, and the failure rate or the number of failure occurrences in a group in which the power storage systems 20 having a predetermined matter in common are collected exceeds a reference value, the management device 10 estimates that the failure is a failure which is specific to the group. That is, it is estimated that the failure is a failure due to the manufacturer, the transporter, the inventory manager or the like that has occurred during manufacturing, transportation, storage, or the like. By properly creating groups, it is possible to determine a failure which is specific to a certain group without missing it.

As a result, in an insurance company or the like that provides an insurance product that compensates for the failure of the power storage system 20, it can be determined whether or not the failure that has occurred is to be compensated for. That is, the insurance company or the like can exclude the power storage system 20 in which a failure due to user or an accidental failure occurs from the coverage of compensation, and determine the power storage system 20 in which a group-specific failure occurs is included in the coverage of compensation.

According to the management device 10 of the present example embodiment described above, it is possible to efficiently estimate the characteristic of the failure that has occurred in the power storage system.

For example, it is possible to estimate efficiently whether the failure is a failure due to user, a failure due to life, a specific failure (a failure due to a manufacturer, a transporter, an inventory manager, or the like during manufacturing, transportation, storage), or a failure that has occurred accidentally.

Moreover, according to the management device 10 of the present example embodiment, it is possible to estimate characteristic of a failure, on the basis of the failure rate or the number of failure occurrences in a group in which the power storage systems 20 having a predetermined matter in common are collected. By creating a group on the basis of the characteristic common matters as described above, a specific failure can be detected without leak.

Examples of a reference aspect will be added below.

1. A management device including:

a collection unit that collects failure information indicating that a failure has occurred in each of a plurality of power storage systems;

a computing unit that computes a failure rate in a group in which the power storage systems each having a predetermined matter in common are collected; and an estimation unit that estimates a characteristic of the failure indicated by the failure information, by comparing the failure rate with a reference value.

2. The management device according to 1, in which the computing unit computes the failure rate by dividing the number of power storage systems in which a failure has occurred by the number of power storage systems belonging to the group.

3. The management device according to 1 or 2, in which the collection unit acquires the failure information including information indicating a type of failure, and in which the computing unit computes the failure rate for each type of failure.

4. The management device according to any one of 1 to 3, in which in the case of estimating a characteristic of a first failure occurring in a first power storage system, indicated by first failure information, the estimation unit estimates the characteristic of the first failure, by comparing the failure rate of the group to which the first power storage system belongs with the reference value.

5. The management device according to 4, in which in a case where the failure rate is equal to or higher than the reference value, the estimation unit estimates that the first failure is a failure which is specific to the group to which the first power storage system belongs, or a failure due to life.

6. The management device according to 5, in which in a case where there is another power storage system belonging to the group to which the first power storage system belongs and in which the failure rate is equal to or higher than the reference value, the power storage system being a system in which the first failure occurs prior to the first power storage system and for which a characteristic different from the failure which is specific to the group is estimated, the estimation unit changes an estimation result of the characteristic of the first failure occurring in the power storage system into the failure which is specific to the group.

7. The management device according to any one of 4 to 6, in which the estimation unit estimates the characteristic of the first failure, on the basis of a use state of the first power storage system.

8. The management device according to 7, in which in a case where the use state deviates from a predetermined use rule, the estimation unit estimates that the first failure is a failure due to user.

9. The management device according to any one of 4 to 8, in which the estimation unit estimates the characteristic of the first failure, further on the basis of a use time of the first power storage system and/or a deterioration degree of the first power storage system.

10. The management device according to 9, in which in a case where the use time and/or the deterioration degree is equal to or more than a predetermined level, the estimation unit estimates that the first failure is a failure due to life.

11. The management device according to 9 or 10, in which the estimation unit computes the deterioration degree, on the basis of at least one of an SOC range in which charging and discharging are performed, a temperature, and a ratio of a current value to a rated current value.

12. The management device according to any one of 1 to 11, in which the computing unit creates the group by collecting the power storage systems in which at least one of a manufacturer, a product type, a date of manufacture, a manufacturing plant, a transporter, an inventory manager, and a lot is identical to each other.

13. The management device according to any one of 1 to 12, in which the computing unit creates the group by collecting the power storage systems each including the same part.

14. The management device according to 13, in which the collection unit acquires the failure information including information indicating a failed part, and in which the computing unit creates the group by collecting the power storage systems each including a failed part.

15. The management device according to 14, in which the computing unit creates the group by collecting the power storage systems each having a part in which at least one of a manufacturer, a product type, a date of manufacture, a manufacturing plant, a transporter, an inventory manager, and a lot is identical to a failed part.

16. The management device according to any one of 1 to 15, in which the computing unit computes the number of failure occurrences in the group, instead of the failure rate in the group, and in which the estimation unit estimates the characteristic of the failure indicated by the failure information, by comparing the number of occurrences of failure with the reference value, instead of comparing the failure rate with the reference value.

17. A management method which is performed by a computer, the method including:

a collection step of collecting failure information indicating that a failure has occurred in each of a plurality of power storage systems;

a computing step of computing a failure rate in a group in which the power storage systems each having a predetermined matter in common are collected; and an estimation step of estimating a characteristic of the failure indicated by the failure information, by comparing the failure rate with a reference value.

18. A program causing a computer to function as:

a collection unit that collects failure information indicating that a failure has occurred in each of a plurality of power storage systems;

a computing unit that computes a failure rate in a group in which the power storage systems each having a predetermined matter in common are collected; and an estimation unit that estimates a characteristic of the failure indicated by the failure information, by comparing the failure rate with a reference value.

This application claims priority based on Japanese Patent Application No. 2017-029913 filed on Feb. 21, 2017, and the disclosure of which is incorporated herein in its entirety.

The invention claimed is:

1. A management device comprising:
at least one memory configured to store one or more instructions; and
at least one processor configured to execute the one or more instructions to:
receive state information from each one of a plurality of power storage systems, wherein each one of the plurality of power storage systems comprises a system controller, a power conditioning system, a battery management system, a battery, and a monitoring apparatus, and wherein the state information comprises measured values associated with one of the plurality of power storage systems;
collect failure information indicating that a failure has occurred in one of the plurality of power storage systems;
compute a failure rate in a group in which the plurality of power storage systems each having a predetermined property in common are collected;
determine a use time of each one of the plurality of power storage systems;
calculate a deterioration degree of each one of the plurality of power storage systems;
estimate
in a case where a use state of the power storage system determined based on the state information deviates from a predetermined use rule, that the failure indicated by the failure information is a failure due to a user,
in a case where the use time and/or the deterioration degree of the power storage system is equal to or more than a predetermined value, that the failure indicated by the failure information is a failure due to life,
in a case where the failure indicated by the failure information is not the failure due to a user or the failure due to life, and the failure rate is less than a reference value, that the failure indicated by the failure information is a failure that has occurred accidentally, and
in a case where the failure indicated by the failure information is not the failure due to a user or the failure due to life, and the failure rate is equal to or more than the reference value, that the failure indicated by the failure information is a failure which is specific to the group; and
transmit an estimation result to a server.

2. The management device according to claim 1,
wherein the processor is further configured to execute the one or more instructions to compute the failure rate by dividing the number of power storage systems in which a failure has occurred by the number of power storage systems belonging to the group.

3. The management device according to claim 1, wherein the processor is further configured to execute the one or more instructions to:
compute the failure rate for each type of failure.

4. The management device according to claim 1, wherein the processor is further configured to execute the one or more instructions to estimate, in a case of estimating a characteristic of a first failure occurring in a first power storage system, indicated by first failure information, the characteristic of the first failure, by comparing the failure rate of the group to which the first power storage system belongs with the reference value.

5. The management device according to claim 4, wherein the processor is further configured to execute the one or more instructions to
estimate, in a case where the failure rate is equal to or higher than the reference value, that the first failure is a failure which is specific to the group to which the first power storage system belongs, or a failure due to life.

6. The management device according to claim 5, wherein the processor is further configured to execute the one or more instructions to
change, in a case where there is a second power storage system belonging to the same group as the first power storage system and in which the failure rate of the group is equal to or higher than the reference value, and where the first failure occurs to the first power storage system and for which a failure type different from a failure specific to the group is estimated, the failure type of the first failure into a failure specific to the group.

7. The management device according to claim 4, wherein the processor is further configured to execute the one or more instructions to
estimate the characteristic of the first failure, on the basis of a use state of the first power storage system.

8. The management device according to claim 4, wherein the processor is further configured to execute the one or more instructions to
compute the deterioration degree, wherein the characteristic of the first failure is estimated on the basis of the deterioration degree of the first power storage system, on the basis of at least one of a state of charge (SOC) range in which charging and discharging are performed, a temperature, and a ratio of a current value to a rated current value.

9. The management device according to claim 1, wherein the processor is further configured to execute the one or more instructions to
create the group by collecting the power storage systems in which at least one of a manufacturer, a product type, a date of manufacture, a manufacturing plant, a transporter, an inventory manager, and a lot is identical to each other.

10. The management device according to claim 1, wherein the processor is further configured to execute the one or more instructions to
create the group by collecting the power storage systems each including the same part.

11. The management device according to claim 10, wherein the processor is further configured to execute the one or more instructions to:
acquire the failure information including information indicating a failed part, and
create the group by collecting the power storage systems each including the failed part.

12. The management device according to claim 11, wherein the processor is further configured to execute the one or more instructions to
create the group by collecting the power storage systems each having a part in which at least one of a manufacturer, a product type, a date of manufacture, a manufacturing plant, a transporter, an inventory manager, and a lot is identical to the failed part.

13. The management device according to claim 1, wherein the processor is further configured to execute the one or more instructions to:
compute the number of failure occurrences in the group, instead of the failure rate in the group, and
estimate the characteristic of the failure indicated by the failure information, by comparing the number of occurrences of failure with a reference value, instead of comparing the failure rate with the reference value.

14. A management method which is performed by a computer, the method comprising:
receiving state information from each one of a plurality of power storage systems, wherein each one of the plurality of power storage systems comprises a system controller, a power conditioning system, a battery management system, a battery, and a monitoring apparatus, and wherein the state information comprises measured values associated with one of the plurality of power storage systems;
collecting failure information indicating that a failure has occurred in one of the plurality of power storage systems;
computing a failure rate in a group in which the plurality of power storage systems each having a predetermined property in common are collected;
determining a use time of each one of the plurality of power storage systems;
calculating a deterioration degree of each one of the plurality of power storage systems;
estimating
in a case where a use state of the power storage system determined based on the state information deviates from a predetermined use rule, that the failure indicated by the failure information is a failure due to a user,
in a case where the use time and/or the deterioration degree of the power storage system is equal to or more than a predetermined value, that the failure indicated by the failure information is a failure due to life,
in a case where the failure indicated by the failure information is not the failure due to a user or the failure due to life, and the failure rate is less than a reference value, that the failure indicated by the failure information is a failure that has occurred accidentally, and
in a case where the failure indicated by the failure information is not the failure due to a user or the failure due to life, and the failure rate is equal to or more than the reference value, that the failure indicated by the failure information is a failure which is specific to the group; and
transmitting an estimation result to a server.

15. A non-transitory storage medium storing a program causing a computer to:
receive state information from each one of a plurality of power storage systems, wherein each one of the plurality of power storage systems comprises a system controller, a power conditioning system, a battery management system, a battery, and a monitoring apparatus, and wherein the state information comprises measured values associated with each one of the plurality of power storage systems;

collect failure information indicating that a failure has occurred in one of the plurality of power storage systems;
compute a failure rate in a group in which the plurality of power storage systems each having a predetermined property in common are collected;
determine a use time of each one of the plurality of power storage systems;
calculate a deterioration degree of each one of the plurality of power storage systems;
estimate
- in a case where a use state of the power storage system determined based on the state information deviates from a predetermined use rule, that the failure indicated by the failure information is a failure due to a user,
- in a case where the use time and/or the deterioration degree of the power storage system is equal to or more than a predetermined value, that the failure indicated by the failure information is a failure due to life,
- in a case where the failure indicated by the failure information is not the failure due to a user or the failure due to life, and the failure rate is less than a reference value, that the failure indicated by the failure information is a failure that has occurred accidentally, and
- in a case where the failure indicated by the failure information is not the failure due to a user or the failure due to life, and the failure rate is equal to or more than the reference value, that the failure indicated by the failure information is a failure which is specific to the group; and transmit an estimation result to a server.

* * * * *